United States Patent [19]

Takeda

[11] Patent Number: 5,011,258

[45] Date of Patent: Apr. 30, 1991

[54] OPTICAL FIBER CONNECTOR

[75] Inventor: Mitsuru Takeda, Tokyo, Japan

[73] Assignee: Daiichi Denshi Kogyo Kabushiki Kaisha, Japan

[21] Appl. No.: 570,825

[22] Filed: Aug. 22, 1990

[30] Foreign Application Priority Data

Aug. 31, 1989 [JP] Japan ............................ 1-102155[U]

[51] Int. Cl.$^5$ ............................................. G02B 6/26
[52] U.S. Cl. .............................. 350/96.20; 350/96.21
[58] Field of Search ................ 350/96.20, 96.21, 96.22

[56] References Cited

U.S. PATENT DOCUMENTS

| | | | |
|---|---|---|---|
| 4,518,220 | 5/1985 | Swanson | 350/96.20 |
| 4,696,538 | 9/1987 | Despouys | 350/96.20 |
| 4,714,317 | 12/1987 | Szentesi | 350/96.21 |
| 4,747,658 | 5/1988 | Borsuk et al. | 350/96.20 |
| 4,752,111 | 6/1988 | Fisher | 350/96.21 |
| 4,787,701 | 11/1988 | Stenger et al. | 350/96.21 |
| 4,798,440 | 1/1989 | Hoffer et al. | 350/96.20 |
| 4,812,009 | 3/1989 | Carlisle et al. | 350/96.21 |
| 4,852,963 | 8/1989 | Lambert | 350/96.21 |
| 4,880,291 | 11/1989 | Aberson, Jr. et al. | 350/96.21 |

Primary Examiner—Brian Healy
Attorney, Agent, or Firm—Silverman, Cass & Singer Ltd.

[57] ABSTRACT

An optical fiber connector using precision ferrule, in which either one of a pair of ferrules (30A) and (30B) can move backwardly while constraining spring (50), the optical connection is not interrupted.

6 Claims, 3 Drawing Sheets

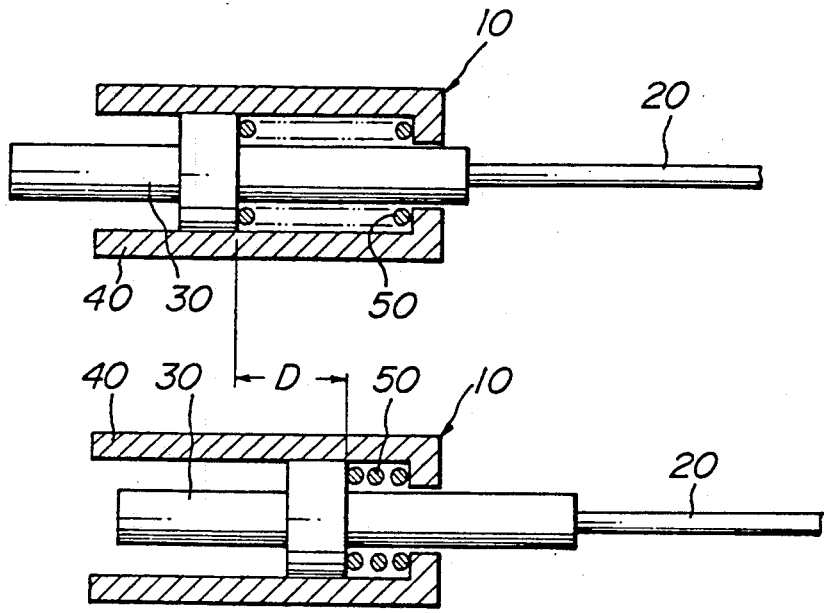
FIG.1a
FIG.1b
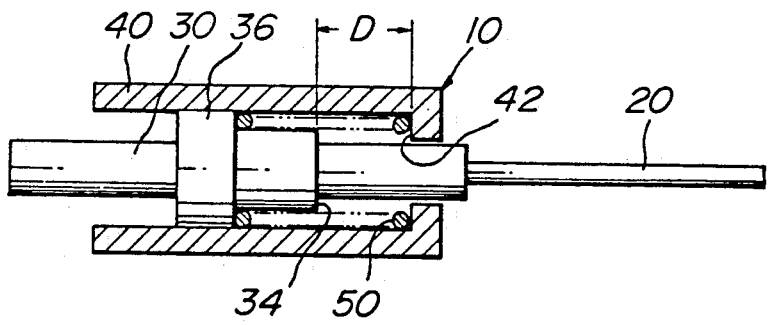
FIG.2
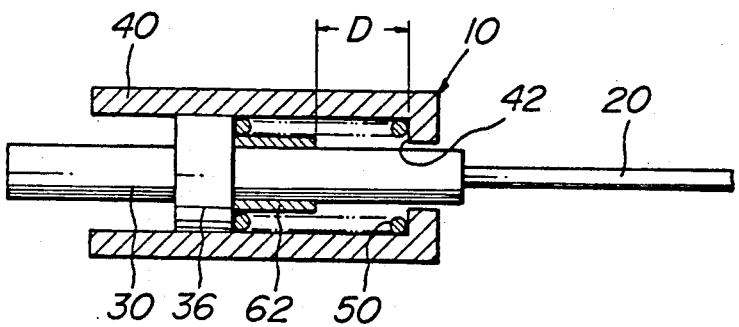
FIG.3

FIG._4
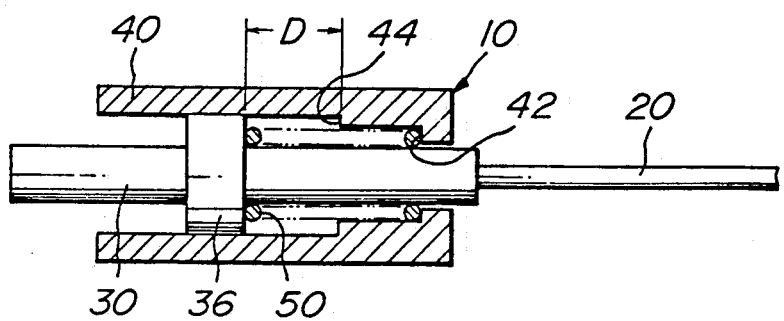
FIG._5
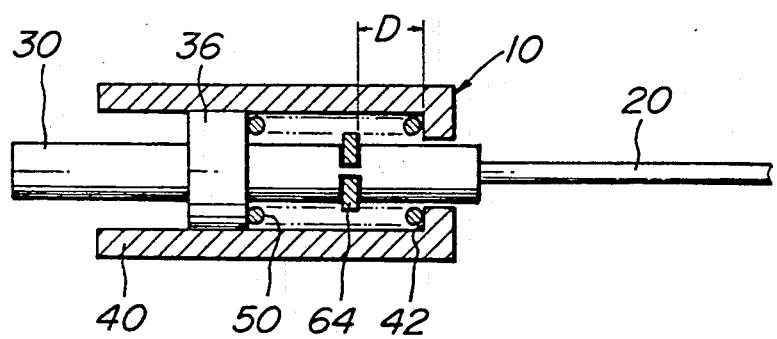
FIG._6
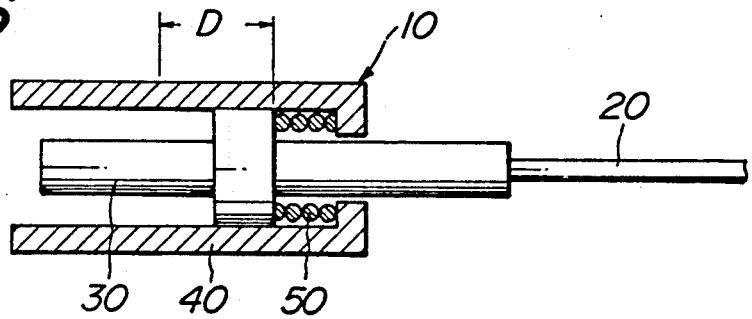

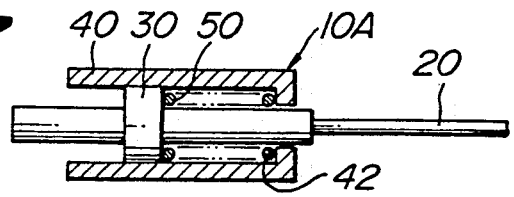
FIG._7
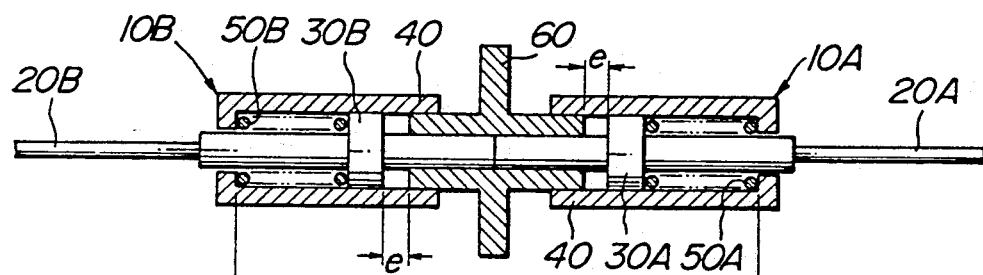
FIG._8a
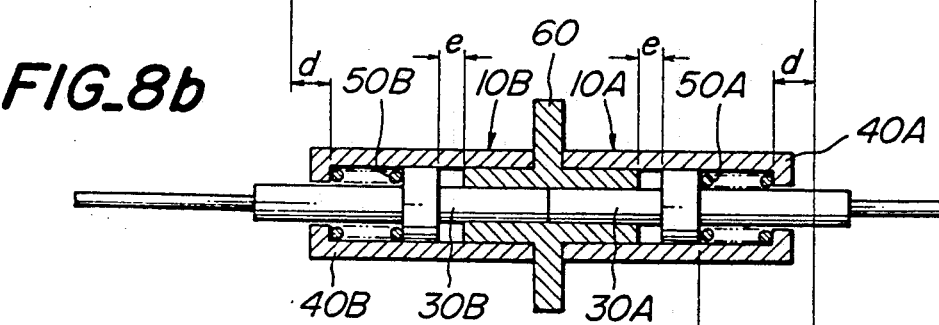
FIG._8b
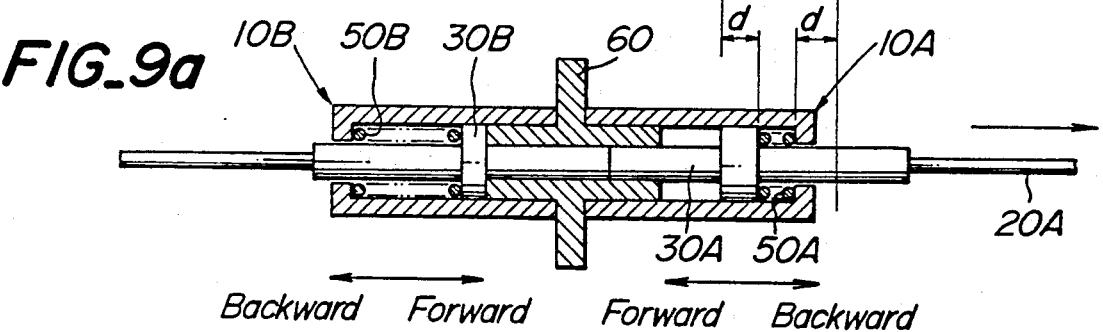
FIG._9a
Backward  Forward     Forward  Backward
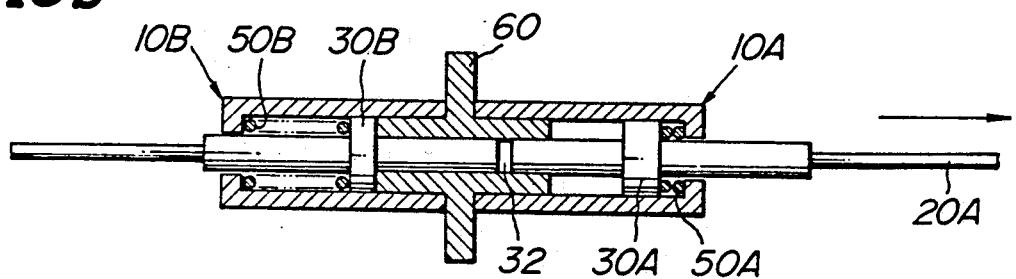
FIG._9b

5,011,258

OPTICAL FIBER CONNECTOR

BACKGROUND OF THE INVENTION

1. Technical Field

The present invention relates to an optical fiber connector using a precise ferrule.

2. Related Art Statement

There are a number of known optical fiber connectors available in the market using precise ferrule made of stainless steel or fine ceramics. Also a considerable number of patent applications related thereto had been filed.

In brief, such known optical fiber connectors have construction generally as shown in FIG. 7. Such known construction comprises an optical fiber 20 fixed at the center of ferrule 30, which is housed in a connector sleeve 40 being axially movable and a compressive spring 50 is arranged between the bottom of the connector sleeve 40 and the ferrule 30.

The ferrule 30 is in general column shape and the connector sleeve 40 is in general cylindrical shape.

FIG. 7 and other figures show the connector just schematically and parts not relating to the present invention are omitted and the size of various parts may be exaggerated to give an easy understanding of the invention.

The establishment of connection in the known optical fiber connectors will be explained by referring to FIG. 8.

(i) As can be seen from FIG. 8a, top of ferrules 30A and 30B respectively of right and left connectors 10A and 10B are abutted together in an adaptor 60.

(ii) Then connector sleeves 40A and 40B are pushed to come together by a distance d by depressing the springs 50A and 50B and the end surfaces of the both ferrules 30A and 30B are joined together by the restoring force of the springs 50A and 50B.

Jointing between the connector sleeves 40A and 40B and the adaptor 60 is effected by a bayonet coupling, a screw coupling and other jointing means.

In the optical fiber connectors 10A and 10B having the above explained constructions, when the optical fiber cord 20A of the right hand connector 10A is pulled, the following situation results.

(1) As can be seen from FIG. 9a, the ferrule 30A comes backward while depressing the spring 50A. The ferrule 30B of the opposite side connector 10B follows this movement and comes forward in a distance corresponding to the backward movement of the ferrule 30A. (forward direction and backward direction are shown in the drawing)

(2) In this case, the ferrule 30B can only move forward direction in a distance corresponding to the amount of constriction of the spring 50B.

(3) By this reason, as shown in FIG. 9a, in which the ferrule 30A comes backward by a distance d from the coupling condition, i.e. as shown in FIG. 8b, there will be no gap between the abutting surfaces of the ferrules 30A and 30B.

In this case, the amount of constriction of the spring 50A becomes 2d by adding the amount d at the time of coupling plus amount d caused by the backward movement of ferrule 30A.

(4) However, if the ferrule 30A comes further backward as shown in FIG. 9b, the opposite ferrule 30B can not follow the backward movement and a clearance 32 is caused at the abutting end surfaces.

Namely the optical connection is substantially interrupted.

SUMMARY OF THE INVENTION

The present invention has for its object to solve the abovementioned problems.

The present invention is to realize an optical fiber connector in which even either of the ferrule 30A or 30B moved backward by depressing the spring 50, the optical connection is not interrupted.

This object can be attained by providing the connector construction as shown in FIGS. 1a and 1b, in which the maximum amount D of constriction of the spring 50 is made less than double of the aforementioned amount of constriction d.

According to the present invention, even either one of the optical fiber cord 20 is pulled backwardly, since the maximum amount of constriction D of the spring 50 is less than 2d ($=d+d$), a clearance 32 will not be produced between the ferrules 30A and 30B.

Therefore, the maximum amount of constriction D is arranged less than the double value of the amount of constriction d at the time of abutting connection. According to this construction, the amount of movement of ferrule when the optical fiber cord 20 is pulled backwards is less than the maximum amount of follow-up forward movement of the other ferrule. Thus there will be no chance in that a clearance is caused between the abutting surface of the ferrule and hence there will be no fear the optical connection is disconnected.

BRIEF DESCRIPTION OF THE DRAWINGS

FIGS. 1a to 6 relates to the present invention and in which:

FIGS. 1a and 1b show cross-sectional view of the connector for explaining the maximum amount D of constriction of the spring 50;

FIGS. 2 to 6 are cross-sectional views of each different embodiments of the present invention;

FIG. 7 is a schematical view for showing a conventional optical fiber connector which had been explained;

FIGS. 8a and 8b are cross-sectional views for explaining coupling condition of the optical fiber connector; and FIGS. 9a and 9b are cross-sectional views for explaining the problems to be solved by the present invention.

DESCRIPTION OF THE PREFERRED EMBODIMENTS

The invention will be explained by referring to the accompanying drawings.

According to the present invention, the maximum amount D of constriction of the spring 50 inside the optical fiber connector being less than double (2d) of the constriction amount d is realized in practice as follows.

First Embodiment

As can be seen from FIG. 2, a stopper step portion 34 is provided on the ferrule 30, which stopper step portion 34 having a stopper surface facing against the bottom 42 of the connector sleeve 40 and the distance between the bottom surface 42 of the connector sleeve 40 and the distance between the bottom surface 42 of the connector sleeve 40 and the stopper step portion 34 is made equal to D, wherein (D≦2d).

By this arrangement, the ferrule 30 can not move backwardly relative to the connector sleeve more than the above distance D so that the spring 50 is not constrained more than the amount D.

The ferrule 30 is in most of the cases formed as cylindrical shape or rectangular column shape provided with a fine hole for passing through the optical fiber along the center axis. In such a case of ferrule 30, the stopper step portion 34 is preferably provided along the whole periphery of cylindrical shape or the like. However, even a part of the stopper step portion is lacked, as far as the function as a stopper is effective, such model may be included in the scope of the present invention.

Second Embodiment

As can be seen from FIG. 3, a stopper sleeve 62 is mounted on the ferrule 30 to rest between its flange 36 and the bottom 42 of the connector sleeve 40 so as to form a gap corresponding to the distance D (≦2d) between the bottom 42 of the connector sleeve 40.

Wherein the outer diameter of the stopper sleeve 62 is made smaller than the inner diameter of the coil spring 50 so as not to interfere the spring action of the coil spring 50.

In this embodiment, the stopper sleeve is fixed in its position against the ferrule 30 as shown in FIG. 3, however, it functions properly as well as the case that the stopper sleeve is not fixed its position. Accordingly, such embodiment of non-fixing the stopper sleeve is also included in the scope of the present invention.

Third Embodiment

As can be seen from FIG. 4, a stopper step portion 44 having the stopper surface against the flange 36 is provided near the bottom portion 42 of the connector sleeve 40. The interval between the stopper step portion 44 and the flange 36 is made equal to the amount D (≦2d).

Fourth Embodiment

As can be seen from FIG. 5, a stopper ring 64 formed of C-shape ring is mounted on the shaft of ferrule 30 and the interval between the stopper ring 64 and the bottom 42 of the connector sleeve 40 is made equal to D (≦2d).

In FIG. 5, a groove is provided on the ferrule 30 to mate with the C-shape ring 64 and fixed it. But the invention is not limited to this construction. The necessary condition is to fix the stopper ring 64 not to move in axial direction of the ferrule 30.

Accordingly, the stopper C-shape ring 64 may be fixed by using adhesive to the ferrule 30.

Fifth Embodiment

As can be seen from FIG. 6, when the ferrule 30 moved backwardly against the bottom surface of the connector sleeve 40 in a distance corresponding to D (≦2d), the spring 50 is fully constrained so that the ferrule can not move further backwardly.

Namely, this embodiment can be realized by arranging and selecting the height of the spring 50 when it is fully constrained and all the spring wire elements come in contact with each other so as not allow further constriction, to be related to said maximum amount D.

In practice, this can be realized by selecting the height of the compressing spring 50 at its fully constrained condition, to be equal to an amount of the distance between the bottom 42 of the sleeve 40 and the flange 36 deducted by the distance D.

Relation Between Adaptor

In the foregoing explanation, no particular consideration has been made for the distance e between the flange 36 of the ferrule 30 and the adaptor 60 as shown in FIGS. 8a, 8b and others, and an assumption was made as:

$$e \geq d.$$

However, there may be a case in which:

$$e < d.$$

In such a case, as can be seen from FIG. 9a, when the optical fiber cord 20A is moved backwardly, and if the ferrule 30 moves a distance more than amount e, a gap 32 may be produced between the ferrule 30B even the amount of movement is less than d.

Accordingly, when the designing the construction and for the setting of the condition D, the above situation should be taken into effect.

What is claimed is:

1. An optical fiber connector (10) comprising a ferrule (30) accommodating an optical fiber cord (20) fixed at center thereof, said ferrule (30) is fitted in a connector sleeve (40) in axially movable manner, and a compression spring (50) is provided between bottom portion (42) of said connector sleeve (40) and said ferrule (30), and in connecting condition a pair of such connectors (10) are used and said ferrules (30) of right and left connectors (10) are abutted together by restoring force of each of the springs (50) of the connectors (10) by constraining each spring (50) by an amount d, the invention is characterized in that a maximum amount of constriction of the spring (50) is less than double of said amount d of constriction.

2. An optical fiber connector as claimed in claim 1, wherein said ferrule (30) is provided with a stopper step portion (34) having a stepwise stopper surface against said bottom portion (42) of the connector sleeve (40), and a distance between the stopper step portion (34) and the bottom portion (42) of the connector sleeve (42) is made equal to said amount D.

3. An optical fiber connector as claimed in claim 1, wherein a stopper sleeve (62) is provided on the ferrule (30) between flange (36) thereof and the bottom portion (42) of the connector sleeve (40) and a distance between one end of said stopper sleeve facing the bottom portion (42) of the connector sleeve (40) and the bottom portion (42) is made equal to said distance D.

4. An optical fiber connector as claimed in claim 1, wherein a stopper step portion (44) having its stopper surface facing against a flange portion (36) is provided at the bottom portion (42) of the connector sleeve (40), and a distance between the stopper surface (44) and said flange portion (36) is made equal to said distance D.

5. An optical fiber connector as claimed in claim 1, wherein a C-shape ring (64) is fixed on the ferrule (30), and a distance between said C-shape ring (64) and the bottom portion (42) of the connector sleeve is made equal to said distance D.

6. An optical fiber connector as claimed in claim 1, wherein a distance between the flange (36) and the bottom portion (42) of the connector sleeve (40) subtracted by a height of the spring (50) in its fully compressed condition is selected to be equal to said distance D.

* * * * *